(12) United States Patent
Leppisaari et al.

(10) Patent No.: US 6,532,227 B1
(45) Date of Patent: Mar. 11, 2003

(54) GENERAL PACKET RADIO SERVICE

(75) Inventors: Arto Leppisaari, Tampere (FI); Jari Hämäläinen, Kangasala (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/063,167

(22) Filed: Apr. 20, 1998

(30) Foreign Application Priority Data

Apr. 21, 1997 (FI) .................................................. 971697

(51) Int. Cl.[7] .......................... H04B 7/212; H04Q 7/20
(52) U.S. Cl. .................... 370/348; 370/322; 370/329; 370/432; 370/342; 455/509; 455/450
(58) Field of Search ................................ 370/321, 322, 370/326, 329, 330, 332, 336, 341, 343, 347, 348, 349, 436, 437, 442, 443, 444, 458, 468, 469, 431; 455/450, 451, 452, 453, 455, 464, 509, 512, 515, 516, 517

(56) References Cited

U.S. PATENT DOCUMENTS

| | | | |
|---|---|---|---|
| 5,257,257 A | 10/1993 | Chen et al. ..................... 370/18 |
| 5,396,539 A | 3/1995 | Slekys et al. ................... 379/59 |
| 5,396,653 A | 3/1995 | Kivari et al. ................... 455/88 |
| 5,430,740 A | 7/1995 | Kivari et al. ................... 371/37.1 |
| 5,521,925 A | * 5/1996 | Merakos et al. ............... 370/337 |
| 5,535,429 A | * 7/1996 | Bergenlid et al. ............. 370/329 |
| 5,570,353 A | 10/1996 | Keskitalo et al. .............. 370/18 |
| 5,577,024 A | 11/1996 | Malkamaki et al. ........... 370/18 |
| 5,606,548 A | 2/1997 | Vayrynen et al. ............. 370/252 |
| 5,640,395 A | 6/1997 | Hamalainen et al. ......... 370/322 |
| 5,708,656 A | 1/1998 | Noneman et al. ............ 370/320 |
| 5,726,981 A | 3/1998 | Ylitervo et al. ............... 370/332 |
| 5,729,534 A | 3/1998 | Jokinen et al. ................ 370/284 |
| 5,729,541 A | 3/1998 | Hamalainen et al. ......... 370/337 |
| 5,778,318 A | * 7/1998 | Talarmo et al. ............... 455/452 |
| 5,784,362 A | * 7/1998 | Turina .......................... 370/321 |
| 5,790,551 A | * 8/1998 | Chan ............................ 370/458 |
| 6,009,331 A | * 12/1999 | Ueda ............................ 455/450 |
| 6,031,827 A | * 2/2000 | Rikkinen et al. ............. 370/330 |
| 6,031,832 A | * 2/2000 | Turina .......................... 370/348 |

FOREIGN PATENT DOCUMENTS

| | | |
|---|---|---|
| EP | 0 168 927 A2 | 1/1986 |
| EP | 0 755 164 A2 | 1/1997 |
| WO | WO 95/16330 | 6/1995 |
| WO | WO 96/22665 | 7/1996 |

OTHER PUBLICATIONS

Global System for Mobile Communications ETSI, GSM 03.64, version 5.2.0.
PCT International Search Report issued on PCT/FI98/00214.

* cited by examiner

Primary Examiner—Steven Nguyen
(74) Attorney, Agent, or Firm—Perman & Green, LLP

(57) ABSTRACT

A method for quickly de-allocating physical channels (PDCH) assigned to packet switched calls in a GPRS supporting GSM digital cellular telephone network. An PDCH de-allocation RLC/MAC control message is broadcast to listening mobile stations from a base station subsystem (BSS) and contains a temporary flow identity (TFI) which is recognised by the listening mobile stations (MS). The mobile stations respond by terminating packet switched data transmissions on the identified PDCHs. The RLC/MAC message also identifies the number of PDCH time slots which can be used before de-allocation must occur.

12 Claims, 2 Drawing Sheets

GENERAL PACKET RADIO SERVICE

FIELD OF THE INVENTION

The present invention relates to general packet radio service (GPRS) and more particularly to a method and apparatus for de-allocation of GPRS physical channels.

BACKGROUND OF THE INVENTION

Current digital cellular telephone systems such as GSM (Global System for Mobile communications) were designed with an emphasis on voice communications. Data is normally transmitted between a mobile station (MS) and a base station subsystem (BSS) over the air interface using the so called circuit switched transmission mode where a physical channel, i.e. a series of regularly spaced time slots on one or more frequencies, is reserved for the duration of the call. For voice communications, where the stream of information to be transmitted is relatively continuous, the circuit switched transmission mode is reasonably efficient. However, during data calls, e.g. facsimile transmissions, internet access, etc, the data stream is 'bursty' and the long term reservation of a physical channel in the circuit switched mode represents an uneconomic use of the air interface.

Given that the demand for data services with digital cellular telephone systems is increasing rapidly, a new GSM based service know as the General Packet Radio Service (GPRS) is currently being standardised by the European Telecommunications Standards Institute (ETSI). GPRS provides for the dynamic allocation of physical channels for data transmission. That is to say that a physical channel is allocated to a particular MS to BSS link only when there is data to be transmitted. The unnecessary reservation of physical channels when there is no data to be transmitted is avoided.

GPRS is intended to operate in conjunction with conventional GSM circuit switched transmission to efficiently use the air interface for both data and voice communications. GPRS will therefore use the basic channel structure defined for GSM. In GSM, a given frequency band is divided in the time domain into a succession of frames, known as TDMA (Time Division Multiplexed Access) frames. The length of TDMA frame is 4.615 ms. Each TDMA frame is in turn divided into eight consecutive slots of equal duration. In the conventional circuit switched transmission mode, when a call is initiated, a physical channel is defined for that call by reserving a given time slot (1 to 8) in each of a succession of TDMA frames. A series of four consecutive time slots on a physical channel is known as a radio block and represents the shortest transmission unit for packet switched data on a physical channel. Physical channels are similarly defined for conveying signalling information. With the introduction of GPRS, physical channels will be dynamically assigned for either switched circuit transmission mode or for packet switched transmission mode. When the network requirement for switched circuit transmission mode is high, a large number of physical channels may be reserved for that mode. On the other hand, when demand for GPRS transmission is high, a large number of physical channels may be reserved for that mode. In addition, a high speed packet switched transmission channel may be provided by assigning two or more slots in each of a succession of TDMA frames to a single MS.

There is illustrated in FIG. 1 the basic 'architecture' of a GSM cellular network which supports GPRS. The terminology used in FIG. 1 is defined, by convention, as follows:

| | |
|---|---|
| MS | Mobile Station |
| PC/PDA | Personal Computer/Personal Data Assistant |
| BSS | Base Station Subsystem |
| BTS | Base Tranceiver Station |
| BSC | Base Station Controller |
| GPRS | General Packet Radio Service |
| HLR | Home Location Register |
| SGSN | Serving GPRS Support Node |
| GGSN | Gateway GPRS Support Node |
| MSC | Mobile Switching Centre |
| SS7 | Signalling System number 7 |
| PSTN | Public-Switched Telephone Network |

The full benefits promised by packet switched transmission are only achieved if a data transmission can be set up very quickly, i.e. there is little point in providing for the transmission of short duration packets if the time required to set up each of those transmissions is relatively long. Rapid set-up is achieved in the proposed GPRS system by defining a 'virtual' channel or 'context' between a MS and the SGSN when the MS first becomes active in the cellular network. This virtual channel is not an actual physical channel but involves creating and storing parameters such as the MS identifier, encryption key, etc, at the SGSN and at the MS. When an actual data transmission is initiated between the MS and the SGSN using GPRS, there is no need to generate and/or transfer this information and the connection can be set up extremely quickly. The proposed GPRS air-interface protocols are set out in the GSM Technical Specification GSM 03.64 (ETSI).

FIG. 2 shows schematically the radio link protocol stacks which are described in the GSM 03.64 specification. The terminology used in FIG. 2 is defined by convention as follows:

| | |
|---|---|
| IP | Internet Protocol |
| SNDCP | Subnetwork Dependent Convergence Protocol |
| LLC | Logical Link Control |
| RLC | Radio Link Control |
| MAC | Medium Access Control |
| GSM RF | GSM Radio Frequency |
| Um | GPRS/MS interface |
| BSSGP | Base Station Subsystem GPRS Protocols |
| ATM | Asynchronous Transfer Mode |
| FR | Frame Relay |
| L1bis | Layer 1 bis |
| SGSN | Serving GPRS Support Node |
| BSC | Base Station Controller |
| Gb | SGSN/BSC interface |

The assignment of physical channels at the radio interface for packet switched transmission is carried out at the RLC/MAC layer by RLC/MAC layer control messages. For example, a MS may initiate a packet transfer by making a 'random access' request using a RLC/MAC message. The number of time slots (or radio blocks) which the MS wishes may be conveyed using a further message. Similarly, the BSS may initiate a packet transfer to the MS using RLC/MAC messages. As already described, when a virtual channel is created between a MS and a SGSN, a MS identifier is assigned to the MS. This identifier is known as a Temporary Logical Link Identifier (TLLI). When a data transmission is initiated between the MS and the BSS and one or more physical channels are allocated, a new RLC/MAC identifier known as a Temporary Flow Identifier (TFI) is assigned to the MS. During the data transmission, RLC/MAC messages will include the TFI in one of their fields to identify the receiving (or transmitting) MS.

It is envisaged that, in a mixed circuit switched/packet switched network, priority will be given to the circuit switched service. This means that if the amount of traffic in the network approaches the network capacity, and a request is made for a circuit switched call, it is necessary to re-allocate physical channels from the packet switched service to the circuit switched service. Re-allocation may be achieved by waiting for ongoing packet switched transmissions to be completed and, upon completion, assigning the released channels to the switched circuit service. However, it is considered more efficient to interrupt ongoing packet switched transmissions on these channels and to immediately allocate the released channels, completing the interrupted transmissions only when the demand for switched circuit transmission has fallen sufficiently (or other non-interrupted packet switched transmissions have been terminated). The existing GPRS proposals require that when capacity is required for switched circuit transmission, RLC/MAC control messages are transmitted to the MSs instructing them to cease transmission on certain specified physical channels and to request access to other physical channels from the BSS. More specifically, a new RLC/MAC control message is defined and which comprises a message identifier field defining the message as a resource reassignment message and a TFI field specifying the MS to receive the message. It is of course necessary to transmit a resource reassignment message separately for each mobile station currently occupying a physical channel which must be de-allocated and the de-allocation process is therefore relatively slow. It is noted that each packet switched transmission generally occupies an uplink and a downlink channel so that two separate RLC/MAC control messages must be sent for each MS.

It is an object of the present invention to provide a physical channel de-allocation method and apparatus for GPRS which enables the interruption of a packet switched data transmission and the rapid de-allocation of a channel or channels occupied by that transmission.

SUMMARY OF THE INVENTION

According to a first aspect of the present invention there is provided a method of de-allocating one or more physical channels previously assigned for packet switched transmission between a plurality of mobile stations (MS) and a base station subsystem (BSS), the method comprising broadcasting from the BSS an RLC/MAC control message having a message-type field identifying the message as a channel de-allocation message, and a de-allocated channel field identifying the physical channel(s) to be de-allocated, wherein said control message is received and acted on by said plurality of MSs using said physical channel(s).

Preferably, said RLC/MAC control message comprises a field defining the number of time slots or radio blocks after which the identified physical channel(s) must be de-allocated. This number may be zero whereupon the physical channel(s) is (are) de-allocated immediately.

Preferably, said RLC/MAC control message contains a field identifying a carrier (i.e. frequency) on which the or each said MS should transmit to the BSS a new packet channel request. More preferably, said RLC/MAC control message contains a PRACH (packet random access channel) allocation field for identifying the time slot(s) where said request should be made on the identified carrier.

Preferably, said RLC/MAC control message is transmitted on the same carrier frequency as was used for said de-allocated physical channel(s). This identifies the message to the MSs as relating to channels on said carrier. The de-allocated channel field therefore only needs to identify the de-allocated time slots. More preferably, said RLC/MAC control message contains a field defining the time slot(s) on the identified carrier where the BSS may transmit a downlink resource reassignment message to the MSs and also a field defining the time slot(s) where the BSS may transmit an uplink resource reassignment message. These resource reassignment messages may include a TFI which was assigned to the MSs before deallocation.

In one embodiment of the invention, said RLC/MAC control message contains a temporary flow identity field which conveys a temporary flow identity (TFI). This TFI is also stored in a memory of each of said MSs whereby each of the MSs can recognise the RLC/MAC control message as a broadcast message.

In an alternative embodiment, the RLC/MAC control message does not require a TFI field. Rather, the message-type field alerts each of the MSs to the fact that the message is a broadcast message to be acted upon by all MSs using the physical channel(s) identified in the de-allocated channel field.

According to a second aspect of the present invention there is provided apparatus for de-allocating one or more physical channels previously assigned for packet switched transmission between a plurality of mobile stations (MS) and a base station subsystem (BSS), the apparatus comprising means for broadcasting from the BSS an RLC/MAC control message having a message-type field identifying the message as a channel de-allocation message, and a de-allocated channel field identifying the physical channel(s) to be de-allocated, wherein all of said MSs using said physical channel(s) are arranged to receive and act upon said control message.

According to a third aspect of the present invention there is provided a cellular telephone system comprising a BSS incorporating the apparatus of the above second aspect of the present invention and a plurality of MSs arranged to receive said broadcast RLC/MAC control message.

DETAILED DESCRIPTION

Figure 1:
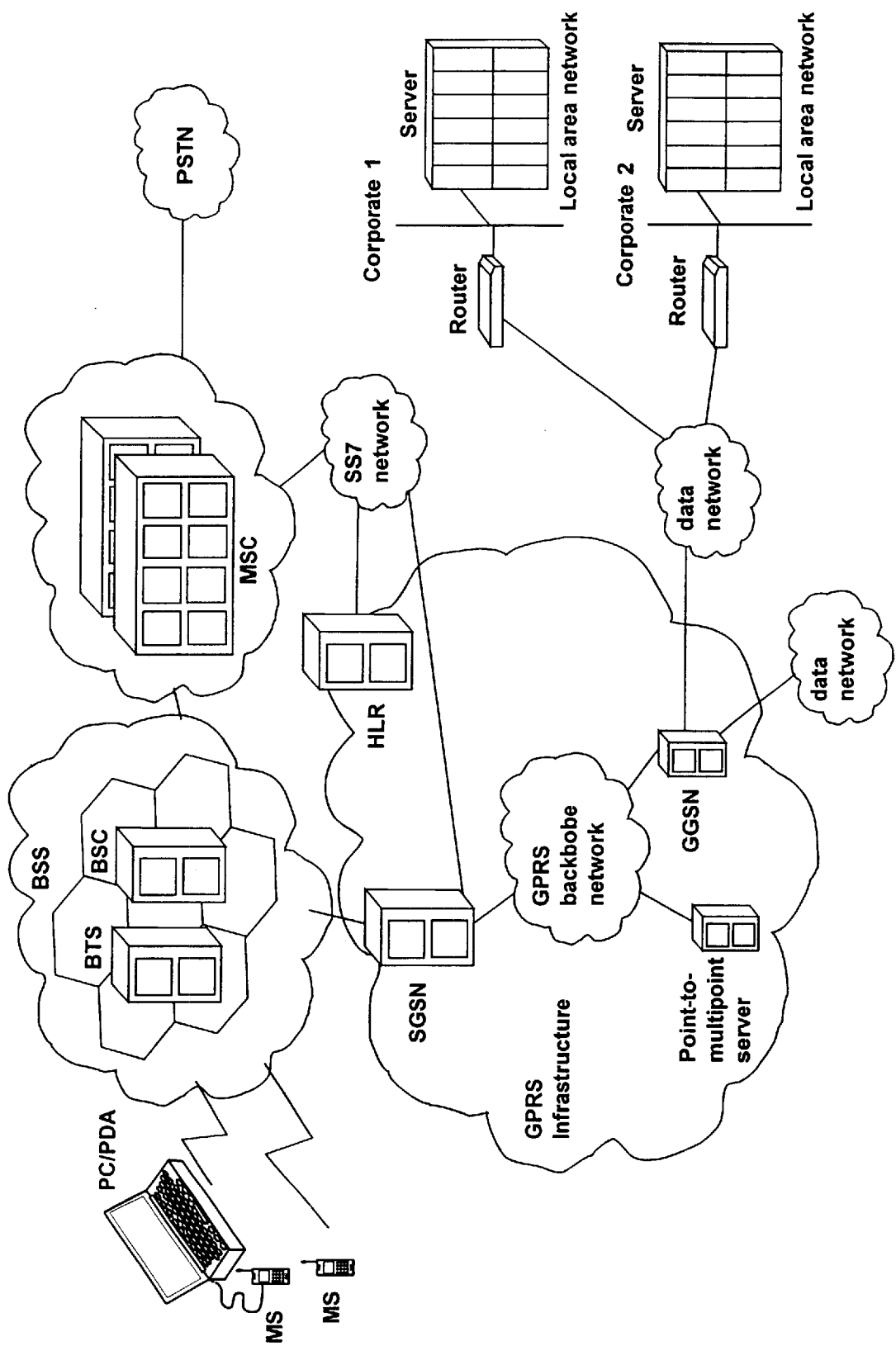
FIG. 1 shows schematically the architecture of a GSM/GPRS digital cellular telephone network.
Figure 2:
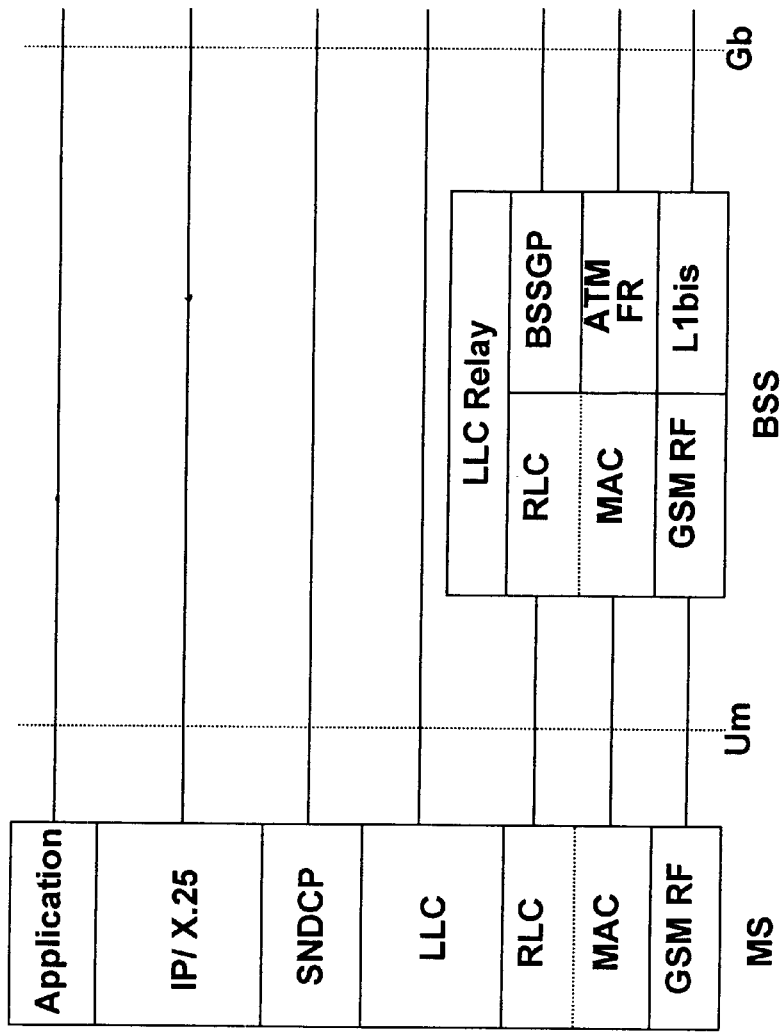
FIG. 2 illustrates the protocol layers of a GPRS radio link of the network of FIG. 1.

The architecture of a GSM network which supports GPRS has already been discussed with reference to FIGS. 1 and 2. The present invention relates to the transmission protocol used in transmissions between mobile stations (MS) and a base station subsystem (BSS), and more particularly to the transmission protocol at the RLC/MAC layer. The signalling process for allocating physical channels for packet switched transmissions (packet data channels—PDCH) to individual MSs is described in detail in GSM technical specification GSM 03.64 and this will not be discussed further here. Rather, the present invention is concerned with the de-allocation of physical channels previously allocated by the BSS.

When a BSS determines that physical channels previously allocated for packet switched transmissions must be freed for other uses, and in particular for use in switched circuit calls, MSs must be notified of this decision to avoid data being lost. More particularly, the MSs must be informed of the physical channels which are being re-allocated and when this re-allocation must occur. A new RLC/MAC control message is therefore defined.

Each MS in a network is preprogrammed with a special temporary flow identity (TFI) code. This code is the same for all MSs and is used by the MSs to identify a 'broadcast' de-allocation message. All active MSs subsequently 'listen' at the carrier frequency assigned for packet data transmission for RLC/MAC control messages transmitted in the downlink direction and containing the allocated TFI. The new RLC/MAC control message has the following structure where the letter 'M' indicates a mandatory field (in this embodiment) and the letter 'O' indicates an optional field:

| No. | Field Name | | Bits |
|---|---|---|---|
| 1 | Message Type | M | 8 |
| 2 | Temporary Flow Identity (broadcast) | M | 7 |
| 3 | De-allocated PDCH | M | 8 |
| 4 | Number of radio blocks before de-allocation | M | 4 |
| 5 | Channel Allocation for uplink channel request | O | 4 |
| 6 | PRACH allocation on defined channel | O | 8 |
| 7 | Time slot to be used for uplink resource re-assignment | O | 8 |
| 8 | Time slot to be used for downlink resource re-assignment | O | 8 |
| | Sum of bits | | 55 |

The fields of the control message are explained below.
Message Type
This field identifies the control message to the listening MSs as a MAC packet resource de-allocation message.
Temporary Flow Identity (Broadcast)
This provides a TFI code and identifies the message as a broadcast message.
De-allocated Time PDCH
This field identifies one or more physical channels (PDCH) to be de-allocated. With an 8-bit field, it is possible to de-allocate PDCHs corresponding to all 8 time slots on the associated carrier frequency.
Number of Radio Blocks Before De-allocation
This field defines when the de-allocation must occur. If immediate de-allocation is required, then the number of radio blocks is defined as zero.
Channel Allocation for Unlink Channel Request
This field identifies the carrier (i.e. frequency) on which the MSs should make a request for a new PDCH.
PRACH Allocation on Defined Channel
This field identifies the time slots on the allocated carrier where the PRACH is allocated.
Time Slot to be Used for Uplink Resource Re-assignment
If the BSS requires to initiate a new packet switched transmission with a MS, the BSS must transmit to the MS both an uplink and a downlink reassignment message on the carrier frequency last used for packet switched transmission between the BSS and that MS. This field identifies the time slot on that carrier where the uplink reassignment message will be transmitted.
Time Slot to be Used for Downlink Resource Re-assignment
This field identifies the time slot where the downlink resource re-assignment message will be transmitted.

It will be appreciated by the skilled person that modifications may be made to the above described embodiment without departing from the scope of the present invention. For example, in order to ensure that all MSs using the PDCHs to be de-allocated are made aware of the de-allocation, it may be appropriate to send the RLC/MAC de-allocation message two or more times in case certain MSs are temporarily outside the area covered by the BSS. Embodiments of the invention may also involve the transmission of the same RLC/MAC de-allocation message on two or more time slots. This may be necessary, for example, when MSs are using multiple time slots within a TDMA frame for a single packet switched data transmission but are only listening for control messages on one of the time slots. With different MSs listening for control messages on different time slots, such multiple transmission is required in order to notify all MSs using a physical channel of the de-allocation of that channel.

The RLC/MAC de-allocation message may include some MS specific information which is identified by including a MS specific identifier in the message. This may be necessary, for example, to allocate different resource reassignment channels (uplink and downlink) to different MSs.

What is claimed is:

1. A method of de-allocating one or more physical channels previously assigned for packed switched transmission between a plurality of mobile stations (MS) and a base station subsystem (BSS), the method comprising broadcasting from the BSS an RLC/MAC control message having a message-type field identifying the message as a channel de-allocation message, and a de-allocated channel field identifying the physical channel(s) to be de-allocated, wherein said control message is received and acted on by said plurality of MSs using said physical channels(s).

2. A method according to claim 1, wherein said RLC/MAC control message comprises a field defining the number of radio blocks after which the identified physical channel(s) must be de-allocated.

3. A method according to claim 1, wherein said RLC/MAC control message contains a field identifying a carrier on which the MSs may transmit to the BSS a new packet channel request.

4. A method according to claim 3, wherein said RLC/MAC control message contains a field identifying the time slots wherein a PRACH is allocated and where the MSs may transmit a random access request for data on the identified carrier.

5. A method according to claim 1, wherein said RLC/MAC control message is transmitted on the same carrier frequency as was used for said de-allocated physical channel (s), thereby identifying the message to the MSs as relating to physical channels on said carrier.

6. A method according to claim 5, wherein said RLC/MAC control message contains a field defining the time slot on said same carrier in which the BSS will transmit an uplink resource reassignment message to the MSs.

7. A method according to claim 5, wherein said RLC/MAC control message contains a field defining the time slot on said same carrier in which the BSS will transmit a downlink resource reassignment message to the MSs.

8. A method according to claim 1, wherein said RLC/MAC control message contains a temporary flow identity field which conveys a temporary flow identity (TFI).

9. A method according to claim 8, wherein said TFI is stored in a memory of the MSs enabling the MSs to recognise the RLC/MAC control message as a broadcast message.

10. A method according to claim 1, wherein the message-type field alerts each of the MSs to the fact that the message is a broadcast message to be acted upon by all MSs using the physical channel(s) identified in the de-allocated channel field.

11. Apparatus for de-allocating one or more physical channels previously assigned for packed switched transmission between a plurality of mobile stations (MS) and a base station subsystem (BSS), the apparatus comprising means for broadcasting from the BSS an RLC/MAC control message having a message type field identifying the message as a channel de-allocating message, and a de-allocated channel field identifying the physical channel(s) to be de-allocated, wherein all of said MSs using said physical channel(s) are arranged to receive and act upon said control message.

12. A cellular telephone system comprising a BSS incorporating the apparatus of claim 11 and a plurality of MSs arranged to receive said broadcast RLC/MAC control message.

* * * * *